J. G. VINCENT.
RADIATOR FOR MOTOR VEHICLES.
APPLICATION FILED JUNE 13, 1917.
1,384,285.
Patented July 12, 1921.
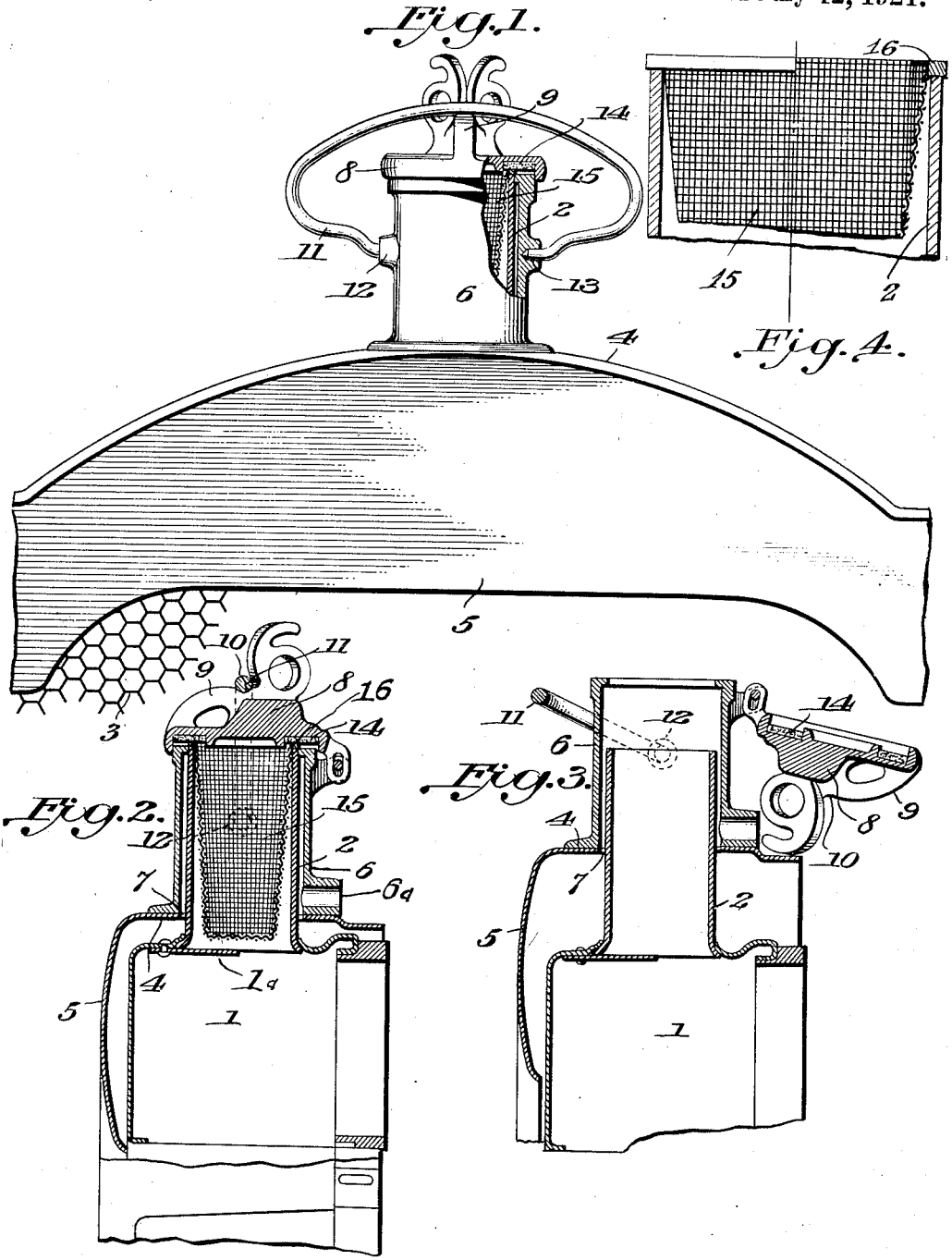

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

RADIATOR FOR MOTOR-VEHICLES.

1,384,285.  Specification of Letters Patent.  Patented July 12, 1921.

Application filed June 13, 1917. Serial No. 174,640.

*To all whom it may concern:*

Be it known that I, JESSE G. VINCENT, a citizen of the United States, and resident of Detroit, Wayne county, State of Michigan, have invented certain new and useful Improvements in Radiators for Motor-Vehicles, of which the following is a specification.

This invention relates to radiators for motor vehicles, and particularly to the construction of the tank and casing parts thereof.

One of the objects of the invention is to provide separate tank and casing or shell elements so that rough soldering and riveting may be used on the tank parts and the whole covered by a casing which may be more easily made of an ornamental nature.

Another object is to provide such a shell or casing with a tube telescoping with the filler tube of the tank and carrying a pivoted cap to close the filler tube.

Other objects of the invention will be apparent from the following description taken in connection with the accompanying drawings, in which:

Figure 1 is a front elevation of the upper part of a radiator made in accordance with this invention, parts of the tube and sleeve being broken away;

Fig. 2 is a vertical, longitudinal central section through the radiator;

Fig. 3 is a section similar to Fig. 2 with the cap open and the shell partly removed, and Fig. 4 is an enlarged detail view of the upper part of the filler tube and the strainer.

Referring to the drawing, 1 is the upper tank of a radiator having the usual filler tube 2, and 3 is the core, these parts being of any suitable construction. $1^a$ is a baffle at the lower end of the tube 2 to prevent splashing of water up into the filler tube. A casing or shell 4 is adapted to fit over the tank and filler tube parts of the radiator and is preferably made of sheet metal and ornamental in design. It includes a part 5 which covers the tank 1 and extends down the sides of the radiator core and a sleeve 6 secured to the part 5 over an opening 7 in the top thereof. This sleeve 6 is adapted to telescope with the tube 2 when the tank is assembled in the casing, and the upper end of the sleeve fits snugly around the tube so that there is no appreciable space between the tube and the sleeve for water to get in when the radiator is being filled. An opening $6^a$ is formed in the sleeve 6 to receive the trunnion of the motor bonnet.

The upper end of the sleeve 6 has a cap 8, loosely pivoted thereon and adapted to fold down upon and close the filler tube 2. On top of the cap is a curved rib 9, notched at 10, and a resilient bail 11 is pivoted at 12 and 13 to the sleeve to be slid along the rib and into the notch for securing or clamping the cap in closed position. Suitable packing 14, may be provided to make a tight closure.

In case a strainer such as 15 is used, the rim 16 thereof is clamped between the cap and the end of the filler tube.

It will be understood that the tank and core of the radiator may be built up independently of the casing and that they may therefore be more readily and cheaply made water tight because the matter of appearance so far as solder and riveting are concerned, need not be so carefully considered. Also a casing of pleasing appearance may be more readily made and the parts may be easily assembled and disassembled. The filler tube 2 of the tank is effectively closed by the cap which is supported on the telescoping sleeve 6 of the casing, the resiliency of the casing and of the bail 11 furnishing a very satisfactory joint between the cap and upper end of the tube.

It is to be understood that my invention is not limited to the exact construction shown and described.

Having thus described my invention, what I claim and desire to secure by Letters Patent is:

1. The combination with a radiator including a tank provided with a filler tube, of a removable shell for covering the tank and having a sleeve to inclose the filler tube, the upper end of the sleeve fitting snugly around the tube, and a cap pivoted to the sleeve and adapted to close the filler tube, said sleeve and cap, when the latter is closed, entirely covering the filler tube.

2. The combination with a radiator including a tank provided with a filler tube, of a removable shell extending down over the tank and having a sleeve to inclose the filler tube, the upper end of the sleeve fitting snugly around the tube, a cap, and means to clamp the cap over the top of the filler tube.

3. The combination with a radiator including a tank provided with a filler tube, of a removable shell having a sleeve to inclose the filler tube, a strainer in the filler tube having a rim supported on the end of the tube, and a cap on the sleeve closing the end of the tube and securing the strainer thereto.

In testimony whereof I affix my signature.

JESSE G. VINCENT.